US012808455B2

(12) United States Patent
Gröning

(10) Patent No.: US 12,808,455 B2
(45) Date of Patent: Nov. 24, 2026

(54) SINGLE-LEVER CARTRIDGE FOR SIGNAL GENERATION

(71) Applicant: Aquis Systems AG, Rebstein (CH)

(72) Inventor: Ingolf Gröning, Bad Mergentheim (DE)

(73) Assignee: Aquis Systems AG, Rebstein (CH)

( * ) Notice: Subject to any disclaimer, the term of this patent is extended or adjusted under 35 U.S.C. 154(b) by 127 days.

(21) Appl. No.: 18/142,824

(22) Filed: May 3, 2023

(65) Prior Publication Data

US 2023/0358333 A1 Nov. 9, 2023

(30) Foreign Application Priority Data

May 9, 2022 (DE) ..................... 10 2022 111 520.8

(51) Int. Cl.

*F16K 37/00* (2006.01)
*E03C 1/04* (2006.01)
*E03C 1/05* (2006.01)
*G01D 5/14* (2006.01)

(52) U.S. Cl.

CPC ........ *F16K 37/0033* (2013.01); *E03C 1/0412* (2013.01); *E03C 1/055* (2013.01); *G01D 5/145* (2013.01)

(58) Field of Classification Search

CPC ...... F16K 37/0033; E03C 1/055; E03C 1/057; G01D 5/145

See application file for complete search history.

(56) References Cited

U.S. PATENT DOCUMENTS

| | | | | |
|---|---|---|---|---|
| 8,770,056 | B2 * | 7/2014 | Terao | G06F 3/0338 74/471 XY |
| 10,941,547 | B2 * | 3/2021 | Chakraborty | G01F 15/068 |
| 11,221,086 | B2 * | 1/2022 | Bello Larroche | F16K 37/005 |
| 11,236,843 | B2 * | 2/2022 | Weyn | F16K 37/0083 |
| 11,255,697 | B2 * | 2/2022 | Leisenheimer | G01D 5/145 |
| 2006/0186215 | A1 | 8/2006 | Logan | |
| 2006/0289343 | A1 * | 12/2006 | Schmitt | E03C 1/04 137/553 |
| 2007/0145319 | A1 * | 6/2007 | Hoernig | E03C 1/0412 251/248 |
| 2015/0292187 | A1 | 10/2015 | Tseng et al. | |
| 2016/0333556 | A1 | 11/2016 | Veros et al. | |
| 2018/0355593 | A1 | 12/2018 | Tracy | |

FOREIGN PATENT DOCUMENTS

| | | | |
|---|---|---|---|
| DE | 10219171 | A1 | 11/2003 |
| EP | 3690292 | B1 | 4/2021 |
| WO | 2009/019731 | A2 | 2/2009 |

* cited by examiner

*Primary Examiner* — Kevin F Murphy

(74) *Attorney, Agent, or Firm* — Bachman & LaPointe, P.C.

(57) ABSTRACT

A cartridge (1) for the generation of control signals for a water mixing system includes a housing (7), a lever attachment (2) which is moveable relative to the housing (7) for the accommodation of a lever, and a detector device for the generation of a signal according to the position of the lever attachment (2).

13 Claims, 6 Drawing Sheets

SINGLE-LEVER CARTRIDGE FOR SIGNAL GENERATION

BACKGROUND OF THE INVENTION

Technical Field

The invention relates to a cartridge, a water system and a method for controlling a water system.

Prior Art

From the prior art, hydraulic single-lever mixers are known which, by means of a limited rotational movement, dictate the relative ratio of hot water to cold water and which, by means of a limited lever movement, dictate the flow rate of water, wherein both functions are mutually combined in the eponymous single lever of the single-lever mixer, such that these functions can be executed simultaneously. The operation of hydraulic single-lever mixers produced by various manufacturers is identical in many respects, such that persons who operate hydraulic single-lever mixers possess a high degree of familiarity with the operability thereof.

Intelligent single-lever mixers are known from EP 3 690 292 B1, which additionally detect the water temperature after mixing, and execute the electronic referral thereof to a control system.

However, in single-lever mixers according to the prior art, water which is to be mixed is, by definition, fed through the single-lever mixer or the housing thereof. A greater degree of flexibility with respect to the arrangement of the lever and water-bearing elements may be desirable.

SUMMARY OF THE INVENTION

The object of the invention is the at least partial resolution of problems associated with the prior art. In particular, the object of the invention is the disclosure of an apparatus which, in a single-lever mixer, provides greater flexibility with respect to the arrangement of water-bearing lines.

This object is fulfilled by a single-lever cartridge as disclosed herein, and by a method also as disclosed herein. Advantageous further developments and embodiments proceed from the sub-claims, and from the present description.

One aspect of the present disclosure relates to a cartridge for the generation of control signals for a water mixing system, comprising: a housing, a lever attachment, which is moveable relative to the housing, for the accommodation of a lever, and a detector device for the generation of a signal, according to the position of the lever attachment.

A further aspect of the present disclosure relates to a method for controlling a water system, particularly a water system in one of the embodiments described herein, comprising: determination of a position of the lever attachment, and the generation of a signal corresponding to this position by the signal generator; transmission of the signal to the control device; and actuation of the at least one actuator by the control device, in accordance with the signal.

One aspect of embodiments can relate to a water system for the output of water, particularly a conditionable water system, having a cartridge in one of the typical embodiments described herein, at least one actuator for controlling the delivery of water, and a control device for controlling the actuator.

Typically, the signal from the detector device represents an at least two-dimensional, or typically a three-dimensional position of the lever attachment. In typical embodiments, a positional output is generated relative to a coordinate system of the cartridge. The term "lever" typically describes a lever projecting from a valve which accommodates the cartridge. The valve can assume the form of a conventional valve, and can be water-bearing. In other embodiments, the cartridge is installed in a non-water-bearing valve, for example in a valve for the operation of a shower, which is otherwise supplied with water by an arrangement which is accommodated under rendering or tiles.

Typical embodiments of the detector device comprise a locator and a valuator. Typically, the valuator is employed, or is designed to generate a signal. The valuator can indicate the position assumed relative to the valuator.

In typical embodiments, the locator is coupled to the lever attachment. Exemplary locators cooperate with the valuator, which is fitted in a fixed arrangement relative to the housing.

Typical locators comprise a permanent magnet, wherein the valuator can comprise a Hall effect sensor. The Hall effect sensor can be the sensor which generates the signal. In this manner, wear-free signal generation is possible, with no sliding contacts other mechanical contacts such as, for example, switches. In embodiments of the invention, the rotational angle and the tilt angle of the detector magnet, for example alpha and phi in a cartesian coordinate system x, y, z, are captured by means of the Hall effect sensor. The term "Hall effect sensor" is typically understood herein as an arrangement of a plurality of individual Hall effect sensors, for example three linear Hall effect sensors. A conversion from the x, y, z system into the alpha, phi system, according to embodiments of the invention, can be executed in the valuator or in another device which is arranged in the data stream down-circuit of the valuator, for example in a communications module or in the control device.

Typical cartridges comprise a valuator having a potentiometer. The potentiometer can generate the signal passively, wherein the signal typically comprises two analogue signal components alpha, phi which are transmitted via individual conductors. Alpha, phi express the angular position of the lever attachment relative to the cartridge, specifically, an angle about the longitudinal axis of the cartridge and a transverse angle to the longitudinal axis. The alpha, phi system thus represents, at least essentially, the operation of a single-lever mixer which is known from the prior art. One advantage of a valuator having potentiometers can be provided in that, by means of the passive action thereof, there is no absolute necessity for a current source on the valuator. Typical potentiometers can be configured as bidirectional, or can comprise a front side and a reverse side having printed conductors, with which a sliding contact cooperates.

In typical embodiments of potentiometers, an annular resistance path of the potentiometer can be interrupted at least once, such that the locator, depending upon the polar position of the lever attachment, connects a first or a second resistance path with the contact ring. In this manner, a plurality of fields can be generated, particularly for the representation or actuation of a variety of functions such as, for example, water temperature or degree of effervescence. Interrupted resistance paths can be connected by means of individual resistors. Moreover, by means of interrupted resistance paths, differential value ranges can be generated, for example for different functions.

In embodiments of cartridges, mechanical latching points or mechanical resistance points can be provided between various fields. This is possible in both valuators having potentiometers and in valuators having Hall effect sensors. In this manner, haptic feedback can be delivered to an operator who executes the transition of a lever, which is attached to a lever attachment, from one field to another field.

Typical cartridges comprise a communications module which is connected, for example, to the valuator by means of a cable connection, or is wirelessly connected, for the transmission of the signal from the valuator to the communications module, In further embodiments, the communications module is configured in an integrated arrangement with the valuator. Typical cartridges comprise an energy supply apparatus. The energy supply apparatus can comprise, for example, a mains connection, a battery receiving area, an energy store or an energy harvesting module which, for example, recovers energy from a temperature differential with hot water. As is customary in “or” listings, a plurality or all or the above-mentioned alternatives can also be provided, unless explicitly indicated to the contrary. An energy store, an energy harvesting module or a mains connection incorporating, for example, a switched-mode power supply, can be configured integrally with the valuator, in order to permit, for example, a compact structure.

Water systems according to the invention, which are designed for the output of water, particularly of conditioned water, comprise a cartridge, at least one actuator for controlling the delivery of water, and a control device for controlling the actuator. Typically, the communications module is designed to transmit a signal which is received from the valuator to the control device. Transmission can be executed wirelessly, for example by means of Bluetooth or WLAN, or by means of a wired or optical arrangement.

Typically, the control device is designed, according to the signal from the valuator, to generate control data with respect to a temperature, a volume flow or a degree of effervescence of water which is to be delivered, or an overall quantity of water which is to be delivered in a delivery process. In typical embodiments, the control device is configured to actuate actuators, such that an output of water from the water system is delivered in accordance with the control data.

In typical water systems, the control device can be configured integrally with the cartridge, for example integrally with the valuator or the communications module. This provides the advantage of a compact design of the overall installation. From the control device, in combination with the cartridge, it is only necessary for control data or commands to be transmitted to the actuators wherein, optionally, further connections, for example with a server or a cloud, can be provided. In preferred embodiments, the control device is arranged remotely from the cartridge, in particular in a housing which is separate from the housing of the cartridge, or at a distance of at least 10 cm or at least 20 cm from the cartridge. This provides an advantage, in that the control device can be arranged at an easily accessible location, or at a location which features sufficient space or an energy supply. To this end, typical control devices can be designed to be communicatively connected with more than one cartridge. In this manner, the conditioning of water can be dictated by a user from various locations. Alternatively, it is also possible for various cartridges, by means of programming, to be assigned to various actuators, water delivery points or devices for the conditioning of water.

In typical water systems, the control device is configured with a programmable design, such that the control device is also configured to generate control data in accordance with the programming of the control device. Thus, for example, the control device can be designed, by means of programming, to process signals from various sensors or valuators. Processing can include a coordinate conversion, for example from the x, y, z system into the alpha, phi system. In this manner, signals from a Hall effect sensor can be employed for conversion into a lever position. In further embodiments, the valuator is designed to convert signals from the Hall effect sensor (x, y, z) into another coordinate system, such that signals, in advance of the relaying thereof, for example by means of the communication device, are already present in the form of converted signals. For the relaying of signals, independently of the coordinate system in which these are to be transmitted, by the adaptation of the control device associated with the cartridge, for example by programming, various devices or actuators can be employed. In the event of the integration of the control device with the cartridge, the cartridge, by means of the control device, can generate control data directly or, in further embodiments, can even be designed to actuate actuators directly. This provides the advantage of a compact design or a standalone solution, particularly for smaller applications, wherein, however, by the respective installation of a control device in each cartridge, higher costs can be generated in the case of complex systems.

One option for the programming of the control device of embodiments of the invention is provided, in that the control device generates control data from signals, in accordance with programming. Programming can comprise, for example, a maximum water temperature, a maximum degree of effervescence or a maximum volume flow or flow rate—also in accordance with a temperature or a degree of effervescence of water. Between the control device and the communications module of the cartridge, communication can be executed via a communication bus.

Programming of the control device can comprise the allocation of various functions to predefined or programmable fields of the valuator which is configured, for example, in the form of a Hall effect sensor, for example the allocation of a temperature input to one field and the allocation of a degree of effervescence input to another field.

Programming of the control device can comprise an adaptation of the generation of control data from the valuator signal received in accordance with a connected device. For example, control data which are dependent upon the actuated device or actuator can be generated from the signal which is received from the valuator as follows:

In the case of the employment of a filter, for example for teamaking water, unfiltered water can be adjusted between cold and hot by the rotation of the lever attachment or the lever through an angular range in excess of 0°, for example between 0° and 90°, about the longitudinal axis of the cartridge. This corresponds to a conventional operation, which is known from many single-lever mixers. Upon the rotation of the lever attachment through an angle below 0°, for example between −90° and 0°, a control data output for the switch-in of the filter is generated, such that an output of filtered water is delivered, optionally at a temperature which also corresponds to the angle. The temperature is set by means of actuators, which influence the mixing ratio of cold to hot water. The mixed water, by the selection of an angular range of less than 0°, can then be led through the filter—in turn, by means of control data, which actuate an actuator for the switch-in of the filter.

In the case of the employment of a boiler, for example for the output of hot, cold or boiling water, an angular range of up to 90°, for example between 0° and 90° can be provided, in turn, for cold/hot adjustment—in an analogous manner to the application of a filter. Control data for the output of boiling water can be delivered by means of an actuator, which controls an output from the boiler, at an angular position of the lever attachment in excess of 90°, for example up to 135°. Preferably, in cartridges, mechanical resistance can prevent any unintentional rotation in excess of 90°.

In the case of the employment of a chiller unit, for example at an angle of less than 0°, for example between 0° and −90°, alternatively or according to the angular position of the lever attachment, in combination with filtered water. In the event of combination with a filter, for example, control data for filtered water associated with an angular position of the lever attachment ranging from 0° to −45°, or control data for chilled water associated with an angular position of the lever attachment ranging from −45° to −90°, can be delivered by the control unit to the corresponding actuators.

In the case of the employment of a carbonator or a sparkling water maker, an output of water combined with $CO_2$ can be delivered, for example at an angular position of the lever attachment about the longitudinal axis of the cartridge of less than 0°, wherein the control device, in response to a signal corresponding to an angular position of less than 0°, delivers an output of corresponding control data for the actuation of an actuator, in this case, for example, a valve in a $CO_2$ infeed. Moreover, in embodiments of the invention, a combination of various ranges, for example for filtered water, chilled water or carbonated water, i.e. water which is combined with $CO_2$, can also be provided. Ranges of the lever attachment for the actuation of the above-mentioned functionalities are typically dictated, in each case, by the programming of the control device. It can thus be provided that, from a setting of 0°, ranges for the respective switch-in of actuators for the filter, the chiller unit and the $CO_2$ infeed can be configured in sequential 30° increments, from 0° to −30°, 30° to −60 and −60° to −90°, wherein this sequence, in further embodiments, can also be differently configured and, in particular, can be freely programmable by a user.

Typical cartridges, for the delimitation of ranges, for example at 0°, −30°, −60° or −45°, typically comprise mechanical resistances for the angular position of the lever attachment about the longitudinal axis of the cartridge.

In embodiments of the invention, the control device, particularly ex-works, incorporates optionally updatable pre-programming, which assigns various functions to various angular ranges, according to the actuators connected. In this manner, the control device, according to the capabilities of the installed water system, can automatically assign various angular ranges to various functions. Additionally, programming, by means of an operating module, can be adjusted according to the requirements of a user, wherein the adjustment can be saved in a memory of the control device.

In typical embodiments, the control device is designed to output control data in accordance with a limited angular range of the lever attachment. If, for example, a spatial limitation is dictated by the installation of the cartridge in an inappropriate location, the control device is designed, further to the programming of a maximum potential angular range of the lever attachment, to adjust the output of control data. An adjustment can comprise, for example, the compression of an angular range which is provided for a given functionality such as, for example, hot/cold. An "inappropriate location" will apply, for example, if a lever is employed on a cartridge which, on the grounds of the presence of a wall or a window, does not permit full actuation over the angular range which is intended, in the absence of any limitation. In principle, the cartridge itself must not incorporate any mechanical limitation. In embodiments of the invention, however, it is possible that the angle of rotation of the lever attachment in the cartridge is rotatable about the longitudinal axis of the cartridge through an overall angular range of at least 210°, at least 270°, a maximum of 300° or a maximum of 330°, i.e. from −135° to +135°, for example, wherein a range of 90° is mechanically excluded. Typical embodiments of cartridges comprise a mechanically excluded angular range of 90°, plus or minus 10°, for the rotation of the lever attachment about the longitudinal axis. The basin is customarily located within this range such that, additionally, it is not physically possible for the lever to be rotated therein. This mechanical limitation also prevents any over-rotation of the cartridge, which can be indicative of a defect. Moreover, a mechanical limitation of this type also provides benefits with respect to production technology, as the mechanical limitation simultaneously functions as an axial support.

In embodiments of the invention, it can also be provided that the cartridge incorporates active elements such as, for example, rotational angle limiters for the angle of the lever attachment, which can be actuated by means of the control device. A further option can be at least one actuator which is actuated by the control device, which can generate a resistance torque on the lever attachment, for example in order to simulate latching points or to prevent any unintentional adjustment of the temperature in excess of a specific threshold, for example by way of a child protection function.

Typical cartridges can comprise an operator module which is designed, according to the signal from the valuator, to generate a display output. In water systems, it can be provided that the display output is delivered in accordance with the programming of the control unit. For example, an optical functional display can be provided integrally to the cartridge, which is executed e.g. in the form of a LED functional display. To this end, the functional display, according to the programmed allocation of fields for the signal from the valuator, can display a function for the field which is actuated by means of the lever attachment and the locator. According to embodiments of the invention, the functional display can be designed to indicate functions in general which are influenced by the current position of the lever attachment. Functions can include, for example, a temperature setpoint for water or a degree of effervescence setpoint for water. The operator module can be integrated in a housing of the cartridge, or can be executed in the form of an external, e.g. Bluetooth-connected device. A plurality of operator modules can also be provided, of which one can be integrated in the housing of the cartridge.

Typical methods comprise an output of a display on the operator module, according to the signal from the valuator or the programming of the control device. Moreover, typical methods can comprise the reception of a user input, for example via Bluetooth, the operator module or the Internet, and an adjustment to the programming of the control device in accordance with this input.

Advantages of the invention can be provided in that the site of installation of the cartridge can be independent of actuators such as, for example, valves. Cartridges can control various functions, wherein the functional allocation of a cartridge can be programmable. Cartridges can be assigned to various actuators, or instructions for maximum actuatable ranges, for example for temperature, can be dictated by the control device. The generation of user profiles for cartridges can be permitted wherein, to this end, the control device can be designed to save or duplicate these user profiles in a remote memory.

A further advantage of embodiments of the invention can be provided by way of an update capability, for example by the programming of the control device with new functions, or by the extension of an existing installation to incorporate further actuators for the execution of further functions. A typical control device can be designed to determine a user behavior, for example with respect to the timing, duration and nature of operations executed by a user. On the basis of a user behavior thus determined, it can be provided that automatic functions are executed at specific time points, for example the provision of an option for boiling water only at specific times of the day, or the automatic switch-off of a water output after a specific time period, typically in accordance with the water output. One example can include the automatic switch-off of a boiling water output after 20 seconds, whereas a switch-off of cold water is only executed after five minutes. The control device can be designed, further to an automatic switch-off, to permit a reclosing operation by a simple movement of the lever, particularly in any direction.

BRIEF DESCRIPTION OF THE DRAWINGS

The invention is described in greater detail hereinafter with reference to the attached drawings wherein, in the figures.

DETAILED DESCRIPTION

Typical embodiments of the invention are described hereinafter with reference to the figures, wherein the invention is not limited by the exemplary embodiments but, instead, the scope of the invention is determined by the claims. In the description of embodiments, under certain circumstances, identical reference symbols are employed for identical or similar elements in different figures and for different embodiments, in the interests of improving the clarity of the description. However, this does not signal that corresponding elements of the invention are limited to the variants represented in the embodiments.

Figure 1:
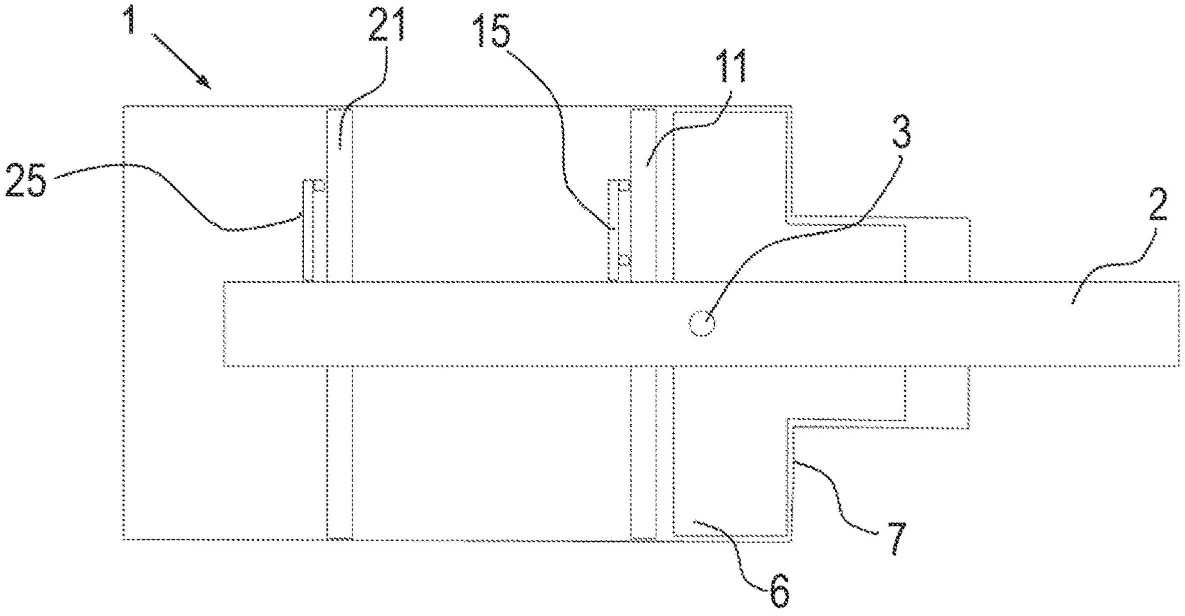
FIG. 1 shows an exemplary embodiment of a cartridge.

FIG. 1 shows an exemplary embodiment of a cartridge 1. A lever attachment 2, to which an unrepresented lever of a single-lever valve is attachable, is mounted by means of a bearing 3 in a bearing ring 6. Upon the rotation of the lever attachment 2, the bearing 3 is actuated orthogonally to its direction of action, such that the bearing ring 6 is rotated in a housing 7 of the cartridge 1. By means of the lever attachment 2, a first locator 15 and a second locator 25 are connected in a mechanically fixed arrangement. A first valuator 11 and a second valuator 21 respectively are mechanically secured to the housing 7.

In typical embodiments having two valuators, the second valuator is typically configured such that the value generated is independent of the position of the lever attachment in the rotational direction and, moreover, is dependent upon the position of the lever in the tilting direction. By this arrangement, both values can be detected in a mutually independent manner.

Figure 2:
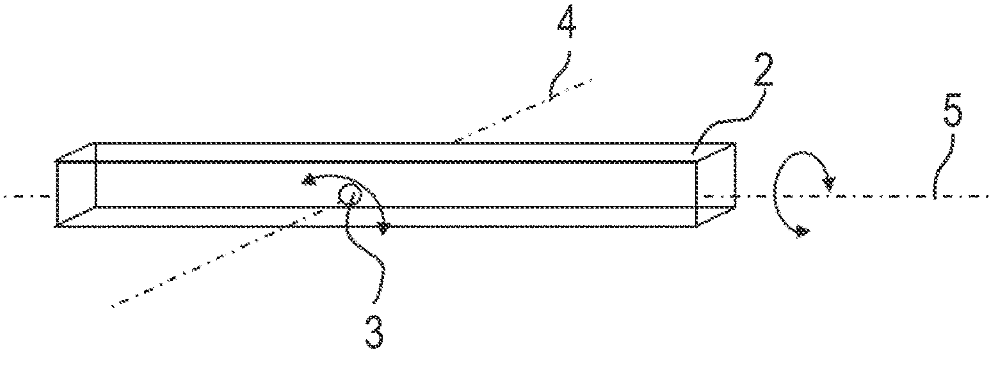
FIG. 2 shows a lever attachment of the cartridge according to FIG. 1, with axes of rotation.

FIG. 2 shows a detailed view of the lever attachment 2 with the bearing 3, wherein a tilt axis 4 and a longitudinal axis 5 of the lever attachment are indicated. The arrows shown illustrate a rotational movement of the lever attachment 2 about the longitudinal axis 5, in the event of the rotation of the unrepresented lever of a single-lever valve, and a tilting movement of the lever attachment 2 about the tilt axis 4 on the bearing 3, in the event of the raising or lowering of the unrepresented lever of a single-lever valve. The longitudinal axis 5 typically coincides with the longitudinal axis of the cartridge 1.

Figure 3:
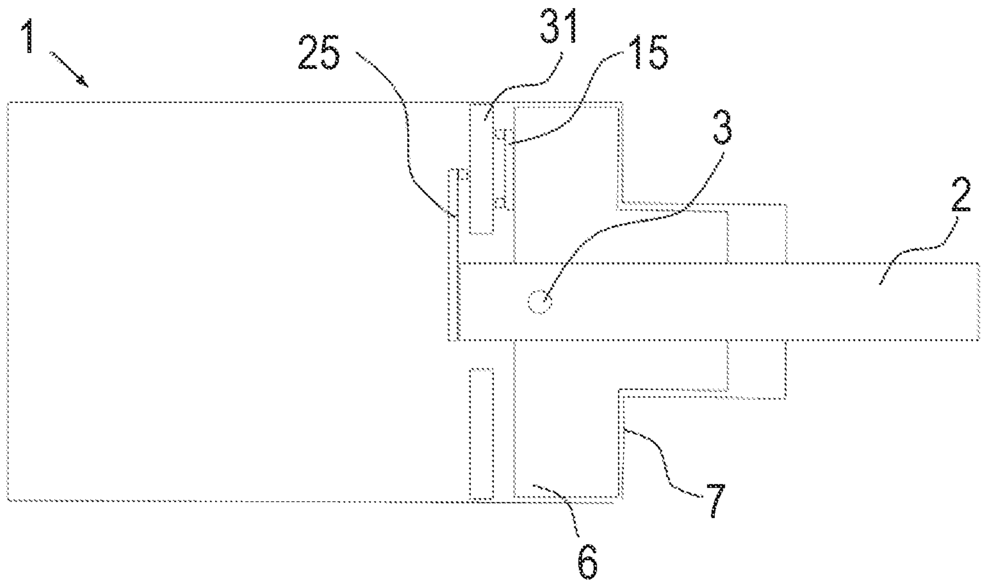
FIG. 3 shows an exemplary embodiment of a cartridge, with a twin valuator.

FIG. 3 shows a further exemplary embodiment of a cartridge 1 having a twin valuator 31. The twin valuator 31, on the side facing the bearing ring 6, is contact-connected with a first locator 15, which is connected to the bearing ring 6. On the opposing side, in the axial direction of the lever attachment 2, the twin valuator 31 is contact-connected with a second locator 25.

Figure 4:
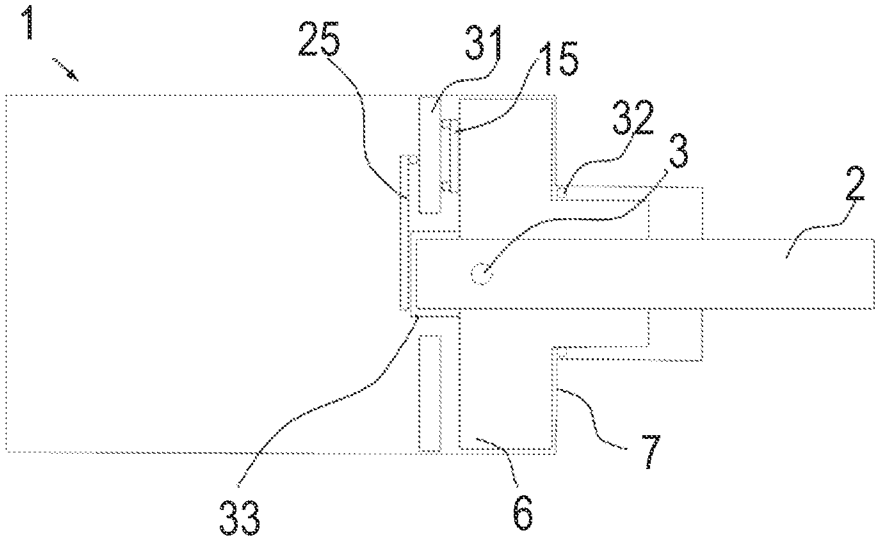
FIG. 4 shows an exemplary embodiment of a cartridge with seals.

FIG. 4 shows a further exemplary embodiment of a cartridge 1, having a twin valuator 31 and an annular seal 32, which prevents any penetration of foreign bodies between the housing 7 and the bearing ring 6. In an analogous manner to the exemplary embodiment according to FIG. 3, a first locator 15 is provided. The cartridge 1 in the exemplary embodiment according to FIG. 4 further comprises a packing seal 33, which forms a seal between the bearing ring 6 and the lever attachment 2. A second locator 25 is connected to the packing seal 33, and is contact-connected with the twin valuator 31.

Figure 5:
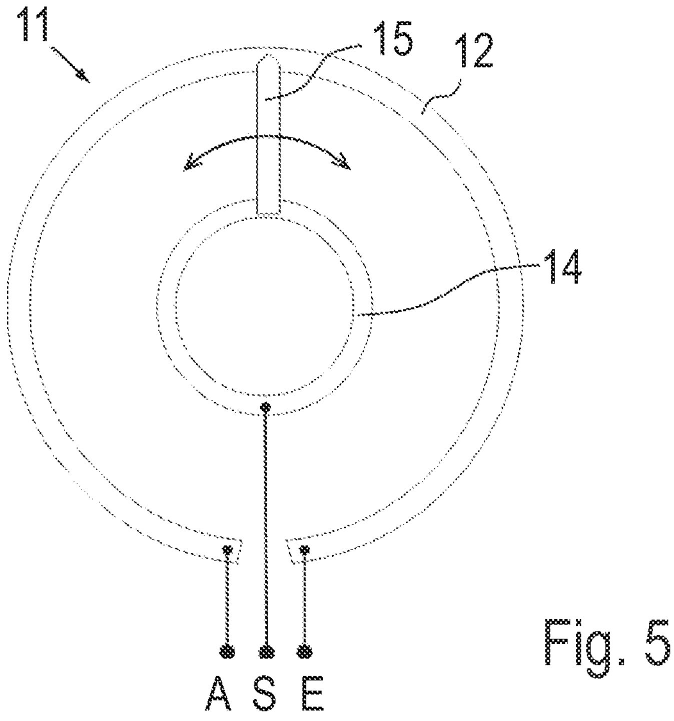
FIG. 5 shows an exemplary embodiment of a first valuator, in the form of a potentiometer.

FIG. 5 shows an exemplary embodiment of a first valuator 11 in the form of a potentiometer, wherein the resistance path 12 is connected on one side to terminal A, and is connected on the other side to terminal E. The contact ring 14 is connected to the terminal S. The first locator 15, which moves in the polar direction, connects the contact ring 14 to the resistance path 12.

Figure 6:
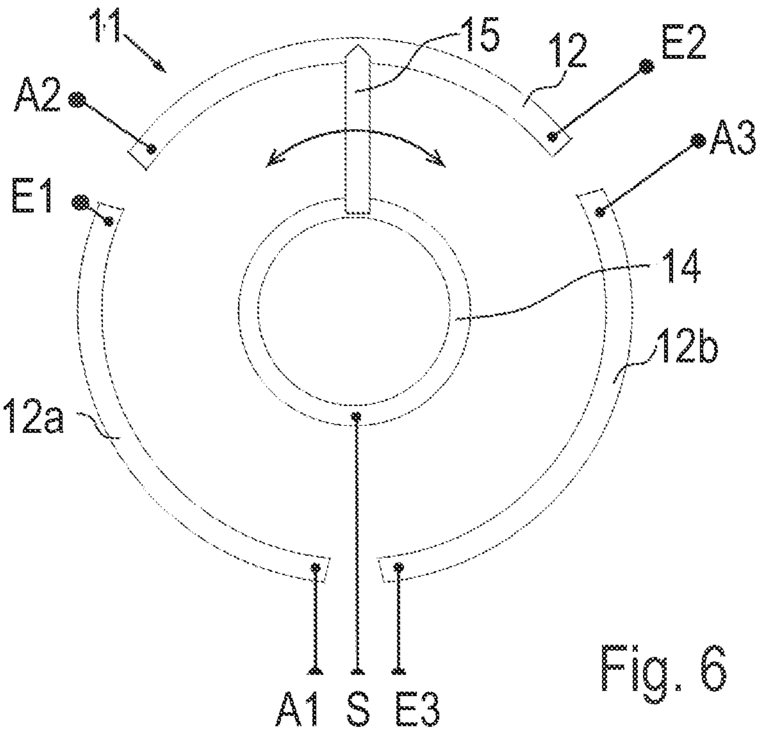
FIG. 6 shows an exemplary embodiment of a first valuator, with an interrupted resistance path.

FIG. 6 shows an exemplary embodiment of a first valuator 11 in the form of a potentiometer having an interrupted resistance path 12, which is interrupted in subregions 12, 12*a* and 12*b*. One side of each resistance path 12 respectively is connected to a terminal A and a terminal E. The contact ring 14 is connected to the terminal S. The first locator 15, which moves in the polar direction, respectively connects the contact ring 14 to one of the resistance paths 12, 12*a* or 12*b*.

Embodiments with an interrupted resistance path can permit a setting of the nature of the medium which is to be delivered and can establish, for example, whether a water output is to be delivered with or without effervescence.

In order to maintain, for example, a known mode of operation of conventional water systems, the exemplary embodiment according to FIG. 6 can be employed. Cold/hot can be selected on the basis of the resistances between S and A2/S and E2, i.e. by means of the resistance path 12. Chilled water can be selected on the resistance path 12*b* between S and A3, S and E3. In this setting, the lever attachment would be moved further than the cold end of the hot/cold resistance path 12. Boiling water might be selected on the resistance path 12*a* between S and A1, S and E1, given that, in an analogous manner, the lever attachment is rotated further in the hot direction, beyond the hot end of the resistance path 12.

Figure 7:
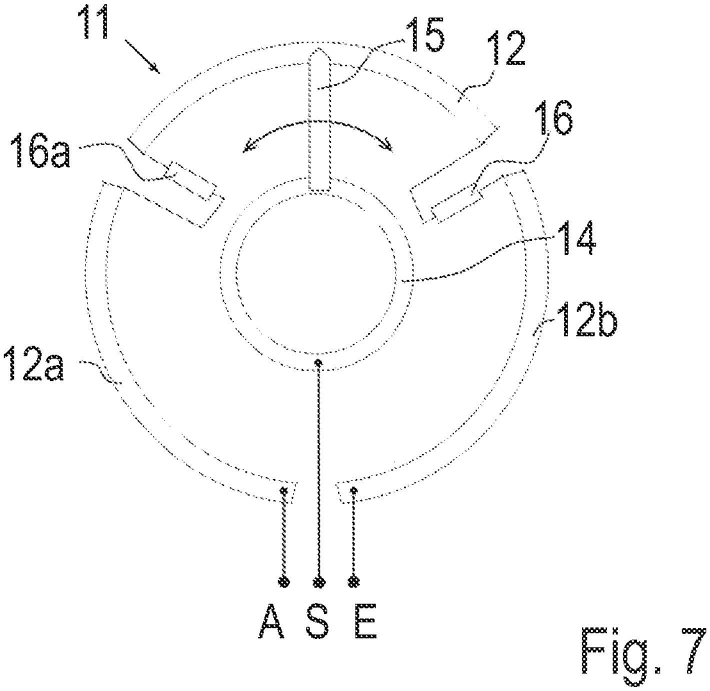
FIG. 7 shows an exemplary embodiment of a first valuator, with interruptions in the resistance path which are connected by resistors.

FIG. 7 shows an exemplary embodiment of a first valuator 11 in the form of a potentiometer, having interruptions in the resistance path 12, which is divided into subregions 12, 12*a* and 12*b*, which are connected by means of resistances 16. The resistances 16, 16*a* connect the subregions 12, 12*a* and 12*b* such that, between terminal A and terminal E, an overall resistance is present. The contact ring 14 is connected to the terminal S. The first locator 15, which moves in the polar direction, connects the contact ring 14 with one of the resistance paths 12, 12*a*, 12*b* respectively, or is arranged in the region of the interruption, such that no contact is established.

Figure 8:
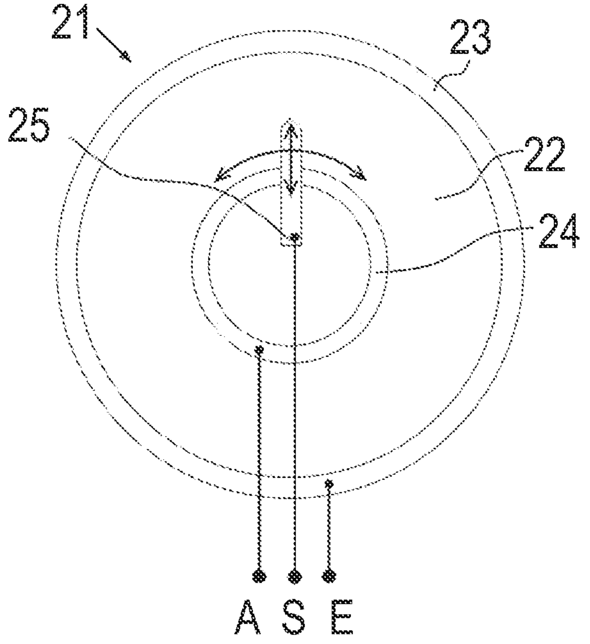
FIG. 8 shows an exemplary embodiment of a second valuator, in the form of a potentiometer.

FIG. 8 shows an exemplary embodiment of a second valuator 21, in the form of a potentiometer. The terminal A is connected to the inner contact ring 24. The terminal E is connected to the outer contact ring 23. Between the inner contact ring 24 and the outer contact ring 23, a planar resistance layer 22 is provided. The terminal S is connected to a second locator 25, which can be moved in both a polar and in a radial direction.

Figure 9:
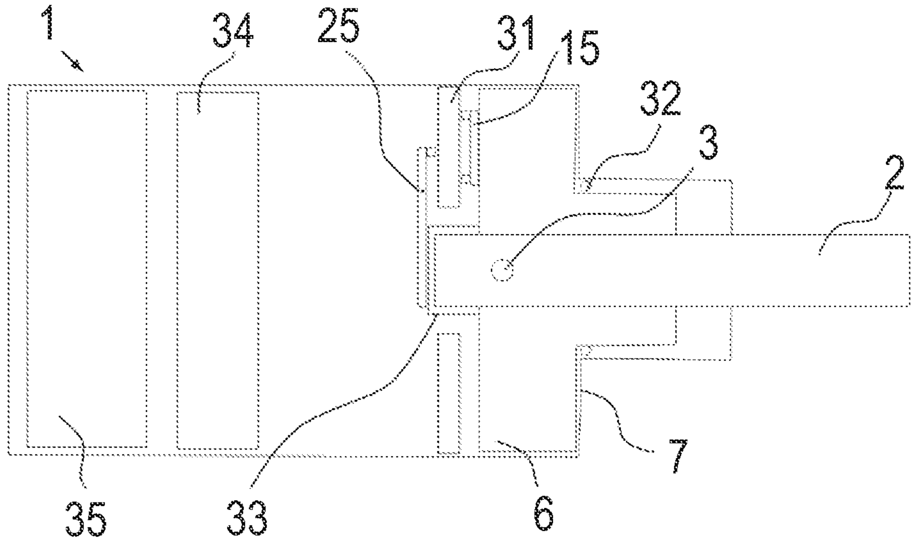
FIG. 9 shows an exemplary embodiment of a cartridge having a communications module and an energy source.

FIG. 9 shows an exemplary embodiment of a cartridge 1, having a communications module 34 and an energy supply apparatus 35. The communications module 34 is connected by means of cables to the twin valuator 31. The communications module 34 is designed for the wireless transmission of signals from the twin valuator 31 to a control device (see FIG. 11). In the exemplary embodiment according to FIG. 9, the energy supply apparatus 35 is configured in the form of a battery. The energy supply apparatus 35 supplies the communications module 34 with electrical energy.

Figure 10:
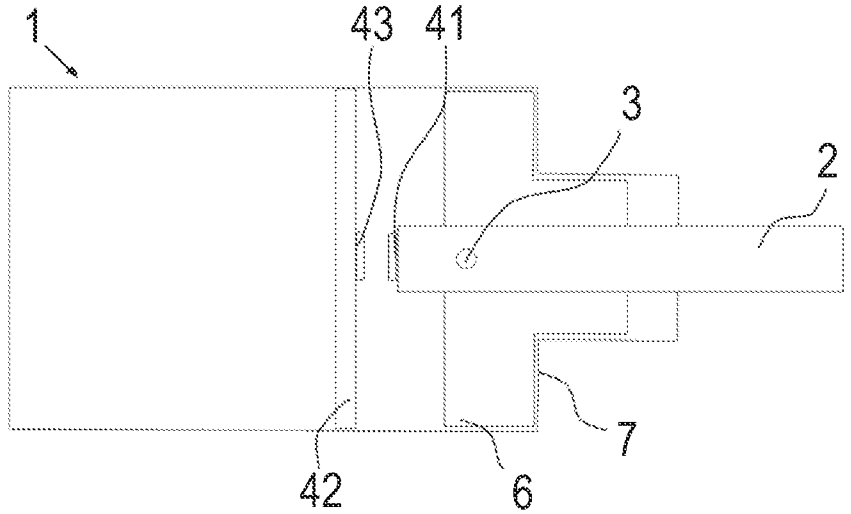
FIG. 10 shows an exemplary embodiment of a cartridge having an electronic valuator.

FIG. 10 shows an exemplary embodiment of a cartridge 1, in which a locator 41 is formed by a permanent magnet, or comprises the latter. The permanent magnet is rigidly fastened to the lever attachment 2, such that the permanent magnet follows the movements of the lever attachment 2.

Moreover, in the exemplary embodiment according to FIG. 10, an electronically configured valuator 42 is provided, which comprises a multi-axis Hall effect sensor 43. The term "multi-axis Hall effect sensor" 43 typically describes a combination of a plurality of linear Hall effect sensors. The Hall effect sensor 43 is connected to the housing 7 of the cartridge 1 in a fixed arrangement. The Hall effect sensor 43 assumes the movements of the permanent magnet in a cartesian coordinate system x, y, z.

In embodiments of the invention, a conversion from the x, y, z system into the alpha, phi system can be executed in the valuator or in another apparatus which is arranged in the data stream, down-circuit of the valuator, for example in the communications module or in the control device. A further option is provided, wherein the control device can process signals directly in the x, y, z system, for example by means of corresponding programming to this effect.

Figure 11:
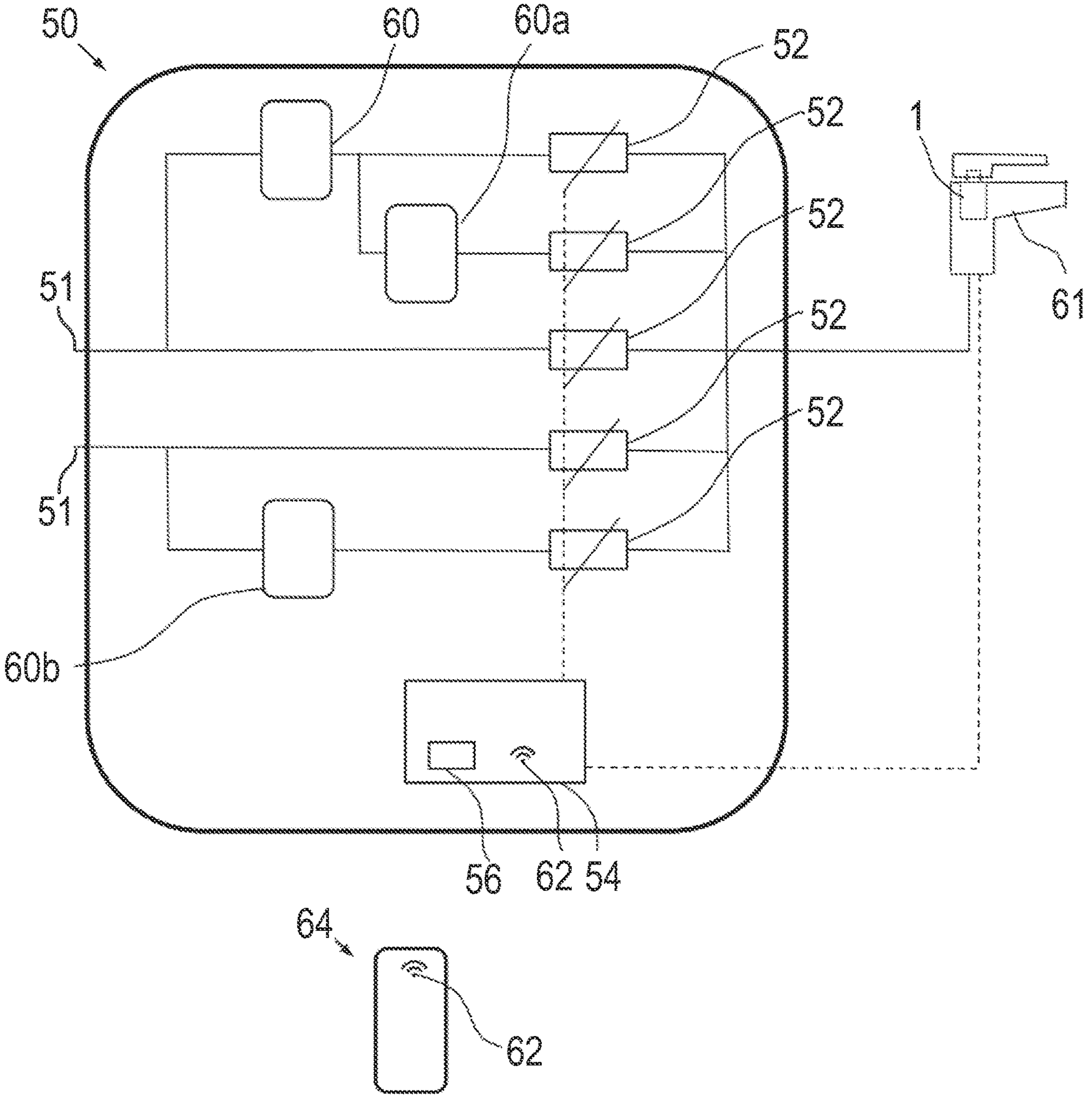
FIG. 11 shows a water system for the output of conditionable water, having a cartridge according to one exemplary embodiment.

FIG. 11 shows a water system 50 for the output of conditionable water, having a cartridge 1 in which, in conjunction with the embodiment described with reference to FIG. 10, is supplemented by the communications module and the energy supply apparatus described in conjunction with FIG. 9.

The water system 50 comprises terminals 51 for hot water and cold water. The water system further comprises actuators 52 for controlling the delivery of water and a control device 54 for controlling the actuators 52. The control device 54 is designed to receive the valuator signal from the communications module and, according to this signal, to generate control data with respect to the temperature, the volume flow and, if required, the degree of effervescence of the water output. The actuators 52 comprise various valves, for example for controlling the flow of boiling water from the tank 60*b*, of chilled water from the tank 60, of water combined with $CO_2$ from the tank 60*a*, and of cold water and hot water, by means of an output device 61.

The control device 54 comprises a memory 56 and, moreover, is connected by means of a wireless or hard-wired data connection, particularly a Bluetooth or WLAN connection, to a data network 62, such that the control device 54 is programmable. By a cable connection or by means of Bluetooth, a data connection for the transmission of signals from the cartridge to the control device 54 and, optionally, in the reverse direction, can be established.

In embodiments of the cartridge with Hall effect sensors, for example, entries for various fields or value ranges of signals from the Hall effect sensor can be saved or programmed in the control device 54, in order to permit the output of various types of water.

The cartridge 1, in the exemplary embodiment according to FIG. 11, further comprises an operator module 64 which is designed, according to the valuator signal and according to a programming of the control device, to generate an optical feedback output for the attention of an operator. To this end, the operator module 64 comprises a functional display which is equipped with LED lighting means and which, for example, can display a temperature setting or degree of effervescence setting for water which is dictated by the cartridge.

The invention is not limited by the above-mentioned embodiments but, instead, the scope of the invention is defined by the attached claims.

LIST OF REFERENCE SYMBOLS

1 Cartridge
2 Lever attachment
3 Bearing
4 Tilt axis
5 Longitudinal axis
6 Bearing ring
7 Housing
11 First valuator
12 Resistance path
14 Contact ring
15 First locator
16 Resistance
21 Second valuator
22 Resistance layer
23 Outer contact ring
24 Inner contact ring
25 Second locator
31 Twin valuator
32 Annular seal
33 Packing seal
34 Communications module
35 Energy supply apparatus
41 Valuator (permanent magnet)
42 Electronic valuator
43 Multi-axis Hall effect sensor

50 Water system
51 Terminals for hot water and cold water
52 Actuator
54 Control device
56 Memory
60 Tank, chilled water
60*a* Tank, carbonated water
60*b* Tank, boiling water
61 Output device
62 Data network
64 Operator module
A Electric terminal, designated as A
S Electric terminal, designated as S
E Electric terminal, designated as E

The invention claimed is:

1. A water system (50) for the output of water, comprising:

a cartridge (1) for the generation of control signals for the water mixing system, comprising:
- a housing (7),
- a lever attachment (2), which is moveable relative to the housing (7), for the accommodation of a lever, and
- a detector device for the generation of a signal, according to the position of the lever attachment (2), wherein the detector device comprises a locator (15, 25, 41) and a valuator (11, 21, 31, 42), wherein the locator (15, 25, 41) is coupled to the lever attachment (2), wherein the locator (15, 25, 41) cooperates with the valuator (11, 21, 31, 42), which is fitted in a fixed arrangement relative to the housing (7), wherein the locator (41) comprises a permanent magnet moveable with the lever attachment (2) in three dimensions (x, y, z) of a cartesian coordinate system, and wherein the valuator (42) comprises a Hall effect sensor (43), wherein the Hall effect sensor detects movements of the permanent magnet in the cartesian coordinate system (x, y, z), at least one actuator (52) for controlling the delivery of water, and a control device (54) for controlling the at least one actuator (52).

2. The water system according to claim 1, further comprising a communications module (34) and/or an energy supply apparatus (35).

3. The water system (50) according to claim 1, wherein the control device (54) is designed, according to the signal from the valuator (11, 21, 31, 42), to generate control data with respect to a temperature, a volume flow and/or a degree of effervescence of water which is to be delivered, and/or an overall quantity of water which is to be delivered in a delivery process.

4. The water system (50) according to claim 3, wherein the control device (54) is programmable, such that the control device (54) is also designed to generate control data in accordance with the programming of the control device (54).

5. The water system according to claim 1, wherein the control device (54) is arranged remotely from the cartridge (1).

6. The water system (50) according to claim 1, having an operator module (64) which is designed, according to the signal from the valuator (11, 21, 31, 42) and/or the programming of the control device (54), to generate a display output.

7. The water system according to claim 1, wherein the locator comprises a first locator, and a second locator, and the valuator comprises a first valuator and a second valuator.

8. The water system according to claim 1, wherein the locator comprises a first locator, and a second locator, and the valuator comprises a first valuator and a second valuator; and wherein the second valuator is configured such that a value generated is independent of position of the lever attachment in a rotational direction, and the value generated is dependent upon a position of the lever in a tilting direction.

9. The water system according to claim 1, wherein an angle of rotation of the lever attachment in the cartridge is rotatable about the longitudinal axis of the cartridge through an overall angular range of at least 210°.

10. The water system according to claim 1, wherein the Hall effect sensor is an arrangement of three linear Hall effect sensors.

11. A method for controlling a water system (50) according to claim 8, comprising:
- determination of the setting of the lever attachment (2) and generation of a signal by the valuator (11, 21, 31, 42) which corresponds to the setting;
- transmission of the signal to the control device (54); and
- actuation of the at least one actuator (52) by the control device (54), according to the signal.

12. The method according to claim 11, comprising:
- output of a display on an operator module (64), according to the signal from the valuator (11, 21, 31, 42) and/or the programming of the control device (54).

13. The method according to claim 11, comprising:
- reception of an input from an operator; and
- adjustment of the programming of the control device, according to the input.

* * * * *